Patented Aug. 29, 1950

2,520,479

UNITED STATES PATENT OFFICE 2,520,479

SUBSTITUTED PIPERAZINES AND METHOD OF PREPARING THE SAME

Hugh W. Stewart, Plainfield, and Ellen G. Lee, Somerville, N. J., assignors to American Cyanamid Company, New York, N. Y., a corporation of Maine No Drawing. Application February 16, 1949, Serial No. 76,853

13 Claims. (Cl. 260—268)

This invention relates to new organic compounds. More particularly it relates to 1-dialkylcarbamyl-4-substituted piperazines and methods of preparing the same.

The 1-dialkylcarbamyl piperazines of the present invention may be illustrated by the following general formula:

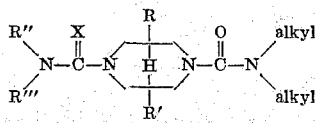

in which R and R' are members of the group consisting of hydrogen and lower alkyl radicals, R" and R''' are hydrogen and aliphatic radicals and X is a member of the group consisting of sulfur and imino radicals. In the above formula the term "lower alkyl" radical means a radical of 1 to 4 carbon atoms.

In general, the compounds of the present invention are solids varying in color from white to tan. In some cases the compounds may be an oil at room temperature. They are, in general, slightly soluble in water but readily soluble in benzene, lower aliphatic alcohols, isopropyl acetate, and the like. The 1-dialkylcarbamylpiperazines, having in the 4-position a guanyl group (when X in the formula is an imino radical), are capable of forming water soluble addition salts.

The preparation of the new compounds of the present invention may be accomplished in several ways, dependent to a large extent on the nature of the product desired. We prefer to prepare the compounds by reacting a 1-dialkylcarbamylpiperazine, having the formula:

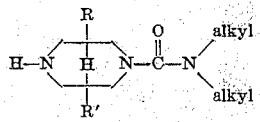

in which R and R' are as defined above or addition salts of such piperazines with any compound which is capable of introducing into the 4-position of the piperazine nucleus a group represented by the formula:

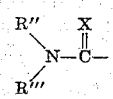

in which R", R''' and X are as previously defined. As starting material we can use compounds such as 1-diethylcarbamylpiperazine; 1-dimethylcarbamyl-2,5-dimethylpiperazine; 1-dimethylcarbamylpiperazine; 1-dimethylcarbamyl-2-methylpiperazine; 1-dipropylcarbamylpiperazine; 1-diisopropylcarbamylpiperazine; 1-dimethylcarbamyl-2,5-dimethylpiperazine; 1-diethylcarbamyl-2,5-diethylpiperazine and the like. The preparation of a number of these compounds is described and claimed in a copending application, Serial Number 661,884, filed April 12, 1946, now Patent No. 2,467,895, April 19, 1949.

As intermediates to be reacted with the 1-dialkylcarbamylpiperazines, or their addition salts, we can use an alkali metal thiocyanate or aliphatic isothiocyanate to produce 1-dialkylcarbamyl-4-thiocarbamylpiperazines and 1-dialkylcarbamyl-4-alkyl thiocarbamylpiperazines. The conditions for carrying out this reaction are somewhat dependent upon the starting materials. In general, the 1-dialkylcarbamyl-4-thiocarbamylpiperazines are readily obtained at room temperature by the interaction of 1-dialkylcarbamylpiperazine hydrochloride in aqueous solution with an alkali metal thiocyanate. However, if the corresponding ring substituted piperazines are desired, they are usually obtained by heating the intermediates in a fusion process. The reactions of 1-dialkylcarbamylpiperazines with aliphatic isothiocyanates are, in general, carried out in organic solvents such as benzene, isopropyl acetate, dibutyl ether, toluene, and the like at temperatures from about 20° C. up to the boiling point of the particular solvent chosen. The 1-dialkylcarbamylpiperazines can also be reacted with a dialkylthiocarbamyl chloride to produce 1-dialkylcarbamyl-4-dialkylthiocarbamylpiperazines.

The 1-dialkylcarbamyl-4-guanylpiperazines may be prepared from 1-dialkylcarbamylpiperazines by the following methods: (1) the reaction of 1-dialkylcarbamylpiperazines, or their addition salts, with a cyanamide in a solvent such as water, aqueous alcohol and the like and, (2) by the reaction of 1-dialkylcarbamylpiperazines with an S-alkyl isothiourea salt in a solvent, such as those given immediately above. It is preferred that these reactions take place within the temperature range of about 70° C. to about 110° C., depending upon the solvent medium chosen. Since these compounds are basic in character due to the presence of the guanyl group, they will form stable addition salts on treatment with acid.

The compounds of the present invention are useful as new pharmaceutical products because of their physiological activities and relatively low toxicity. Some of the compounds exhibit marked analgesic properties, others are useful because of other properties.

The following examples show in greater detail the preparation of illustrative 1-dialkylcarbamyl-4-substituted piperazines within the scope of the present invention.

EXAMPLE 1

*Trans-1-diethylcarbamyl-2,5-dimethyl-4-guanylpiperazine acetate*

To a solution of 53 parts of trans-1-diethylcarbamyl-2,5-dimethylpiperazine in 23.6 parts of 36% hydrochloric acid is added 67 parts of 24% aqueous cyanamide. The mixture is made acidic to Congo red with hydrochloric acid and refluxed for seven hours. The reaction mixture is saturated with solid potassium carbonate and the trans - 1 - diethylcarbamyl - 2,5 - dimethyl-4-guanylpiperazine is extracted with acetone. The solvent is removed by evaporation and the free base is dissolved in glacial acetic acid. The acetate salt is obtained by precipitation with absolute ether. The product obtained is trans-1-diethylcarbamyl - 2,5 - dimethyl - 4 - guanylpiperazine acetate which melts at 208.1°–209.6° C.

EXAMPLE 2

*1-diethylcarbamyl-4-guanylpiperazine hemisulfate*

A slurry of 40 parts of absolute alcohol, 18.5 parts of 1-diethylcarbamylpiperazine in 13.9 parts of S-methylthiourea sulfate is refluxed for 14 hours. The reaction mixture is filtered and the filtrate is evaporated. The residue is purified by recrystallization from amyl alcohol and the product obtained is 1-diethylcarbamyl-4-guanylpiperazine hemisulfate, having a melting point of 236.0°–240.6° C. with decomposition.

EXAMPLE 3

*1-diethylcarbamyl-4-thiocarbamylpiperazine*

To 21.6 parts of 5 N hydrochloric acid is added 18.5 parts of 1-diethylcarbamylpiperazine with cooling. To the mixture is added a solution of 9.7 parts of potassium thiocyanate in 15 parts of water. The reaction mixture is allowed to stand overnight and is then evaporated under reduced pressure on a steam bath. The residue is recrystallized from amyl alcohol. The product, 1 - diethylcarbamyl - 4 - thiocarbamylpiperazine, melting at 138.2°–140.0° C. is obtained.

EXAMPLE 4

*1-diethylcarbamyl-4-ethylthiocarbamylpiperazine*

To a solution of 55.6 parts of 1-diethylcarbamylpiperazine in 80 parts of benzene is slowly added 26.1 parts of ethyl isothiocyanate. The temperature of the reaction mixture is maintained at 30°–40° C. with cooling. The reaction mixture is then heated at refluxing temperature for ½ hour. The product is precipitated from solution by the addition of 100 parts of petroleum ether. The product, 1-diethylcarbamyl-4-ethylthiocarbamylpiperazine, when crystallized from a mixture of isopropyl acetate and petroleum ether, melts at 87.5°–88° C.

EXAMPLE 5

*Trans-1-diethylcarbamyl-2,5-dimethyl-4-thiocarbamylpiperazine*

To a solution of 64 parts of trans-1-diethylcarbamyl-2,5-dimethylpiperazine in 350 parts of absolute ether is added anhydrous hydrogen chloride until the slurry is acidic to Congo red paper. The crystallized salt is isolated by filtration and dried. It is then ground in a mortar and mixed well with 32 parts of potassium thiocyanate. The mixture is heated at its melting point (120°–130° C.) for ½ hour. It is then extracted with 85 parts of boiling isopropyl acetate, and the hot extract is filtered. The filtrate, on cooling, deposits white crystals of trans-1-diethylcarbamyl-2,5-dimethyl - 4 - thiocarbamylpiperazine which melts at 123°–123.5° C.

EXAMPLE 6

*1-diethylcarbamyl-4-allylthiocarbamylpiperazine*

To a solution of 55.6 parts of 1-diethylcarbamylpiperazine in 40 parts of benzene is slowly added at 35°–40° C. with cooling and stirring, 29.7 parts of allyl isothiocyanate. The reaction mixture is refluxed for ½ hour and the benzene then removed by distillation. The residue is crystallized from 26 parts of isopropyl acetate and 43 parts of petroleum ether. The 1-diethylcarbamyl-4-allylthiocarbamylpiperazine melts at 80°–80.5° C.

We claim:

1. Compounds of the group having the general formula:

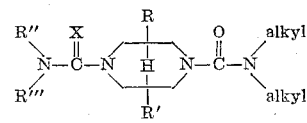

in which R and R' are members of the group consisting of hydrogen and lower alkyl radicals, R'' and R''' are members of the group consisting of hydrogen and an aliphatic radical of 1 to 4 carbon atoms and X is a member of the group consisting of sulfur and imino radicals.

2. Compounds having the general formula:

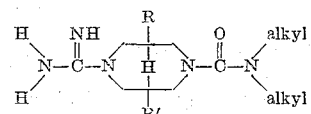

in which R and R' are lower alkyl radicals.

3. Compounds having the general formula:

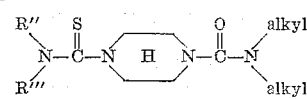

in which R'' is an aliphatic radical of 1 to 4 carbon atoms and R''' is hydrogen.

4. Compounds having the general formula:

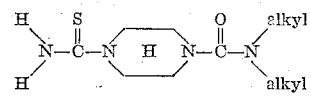

5. Trans-1-diethylcarbamyl - 2,5 - dimethyl-4-guanylpiperazine.

6. 1-diethylcarbamyl - 4 - thiocarbamylpiperazine.

7. 1 - diethylcarbamyl-4-ethylthiocarbamylpiperazine.

8. A method of preparing compounds having the general formula:

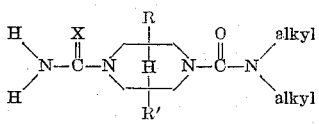

in which R and R' are members of the group consisting of hydrogen and lower alkyl radicals and X is a member of the group consisting of sulfur and imino radicals which comprises reacting a compound having the following formula:

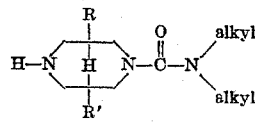

in which R and R' are as defined above with a member of the group consisting of alkali metal thiocyanates, cyanamide and thiocarbamyl halides and recovering the said 1-dialkylcarbamyl-4-substituted piperazine therefrom.

9. A method of preparing compounds having the general formula:

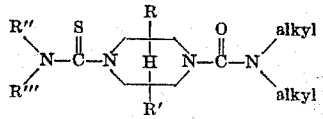

in which R and R' are members of the group consisting of hydrogen and lower alkyl radicals, R'' and R''' are members of the group consisting of hydrogen and an aliphatic radical of 1 to 4 carbon atoms which comprises reacting a compound having the following formula:

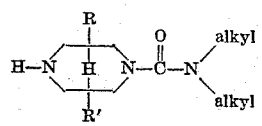

in which R and R' are as defined above with a member of the group consisting of alkali metal thiocyanates, alkyl isothiocyanates and dialkylthiocarbamyl halides and recovering the said 1-dialkylcarbamyl - 4 - thiocarbamyl piperazine therefrom.

10. A method of preparing a 1-dialkylcarbamyl-4-thiocarbamylpiperazine which comprises reacting a 1-dialkylcarbamylpiperazine with an alkali metal thiocyanate in the presence of a solvent and thereafter recovering said 1-dialkylcarbamyl-4-thiocarbamylpiperazine therefrom.

11. A method of preparing 1-diethylcarbamyl-4-thiocarbamylpiperazine which comprises reacting 1-diethylcarbamylpiperazine with potassium thiocyanate in a substantially aqueous solution and recovering said 1-diethylcarbamyl-4-thiocarbamylpiperazine therefrom.

12. A method of preparing 1-diethylcarbamyl-4-ethylthiocarbamylpiperazine which comprises reacting 1-diethylcarbamylpiperazine with ethyl isothiocyanate in a solvent and recovering said 1-diethylcarbamyl - 4 - ethylthiocarbamylpiperazine therefrom.

13. A method of preparing trans-1-diethylcarbamyl - 2,5 - dimethyl - 4 - guanyl piperazine which comprises heating trans-1-diethylcarbamyl-2,5-dimethylpiperazine with cyanamide in a solvent and recovering said trans-1-diethylcarbamyl-2,5-dimethyl-4-guanyl piperazine therefrom.

HUGH W. STEWART.
ELLEN G. LEE.

No references cited.